(12) United States Patent
Gupta et al.

(10) Patent No.: US 9,215,305 B2
(45) Date of Patent: *Dec. 15, 2015

(54) VOICE-OPERATED INTERFACE FOR DTMF-CONTROLLED SYSTEMS

(71) Applicant: AT&T Intellectual Property II, L.P., Atlanta, GA (US)

(72) Inventors: Narendra K. Gupta, Dayton, NJ (US); Benjamin J. Stern, Morris Township, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,213

(22) Filed: Nov. 4, 2014

(65) Prior Publication Data

US 2015/0057051 A1    Feb. 26, 2015

Related U.S. Application Data

(63) Continuation of application No. 14/021,452, filed on Sep. 9, 2013, now Pat. No. 8,917,827, which is a continuation of application No. 11/051,523, filed on Feb. 4, 2005, now Pat. No. 8,532,267, which is a continuation of application No. 09/757,454, filed on Jan. 10, 2001, now Pat. No. 6,868,142.

(51) Int. Cl.
| | |
|---|---|
| *H04M 1/64* | (2006.01) |
| *H04M 1/665* | (2006.01) |
| *H04M 1/27* | (2006.01) |
| *H04M 1/652* | (2006.01) |
| *H04M 3/533* | (2006.01) |

(Continued)

(52) U.S. Cl.
CPC .............. *H04M 1/665* (2013.01); *H04M 1/271* (2013.01); *H04M 1/6041* (2013.01); *H04M 1/652* (2013.01); *H04M 3/53333* (2013.01); *H04M 2201/40* (2013.01); *H04Q 1/45* (2013.01)

(58) Field of Classification Search
CPC . H04M 3/533; H04M 2201/40; H04M 1/271; H04M 1/6505; H04M 3/42059; H04M 1/575; H04M 1/50; H04M 1/30; H04M 19/02; H04M 1/6066; H04M 1/6091; H04M 3/493; H04Q 1/453; H04Q 11/04
USPC ................ 379/67.1, 88.01–88.04, 88.1, 88.2, 379/142.1, 142.18, 283, 339, 353, 418; 455/569.1–569.2
See application file for complete search history.

(56) References Cited

U.S. PATENT DOCUMENTS

| | | |
|---|---|---|
| 4,757,525 A | 7/1988 | Matthews et al. |
| 5,651,056 A | 7/1997 | Eting et al. |
| 5,797,124 A | 8/1998 | Walsh et al. |

(Continued)

*Primary Examiner* — Akelaw Teshale

(57) ABSTRACT

An arrangement for allowing "hands-free" access to DTMF-controlled systems, such as one's voice mail messaging systems, utilizes a speech-to-DTMF tone application that monitors the communication between the user and the DTMF-controlled system. A speech recognition unit is utilized to retrieve certain voice commands (e.g., "next", "skip", "repeat", "forward", etc.) when uttered by the user. The application then translates the received commands into the proper DTMF tone sequence used by the DTMF-controlled system and transmits the DTMF tones to the system. The application is particularly useful in the cell phone environment and avoids the necessity of the user to constantly switch between using the keypad and listening to messages/commands from the system.

20 Claims, 3 Drawing Sheets

(51) Int. Cl.
*H04M 1/60* (2006.01)
*H04Q 1/45* (2006.01)

(56) References Cited

U.S. PATENT DOCUMENTS

| | | | |
|---|---|---|---|
| 5,805,672 A | 9/1998 | Barkat et al. | |
| 5,884,262 A * | 3/1999 | Wise et al. | 704/270.1 |
| 5,907,608 A * | 5/1999 | Shaffer et al. | 379/211.02 |
| 6,044,133 A | 3/2000 | Furukawa et al. | |
| 6,069,940 A | 5/2000 | Carleton et al. | |
| 6,198,947 B1 | 3/2001 | Barber | |
| 6,208,966 B1 | 3/2001 | Bulfer | |
| 6,229,880 B1 | 5/2001 | Reformato et al. | |
| 6,349,222 B1 | 2/2002 | Hafuz | |
| 6,370,506 B1 | 4/2002 | Ahlwalia | |
| 6,459,785 B1 | 10/2002 | Naumburger | |
| 6,493,670 B1 * | 12/2002 | Croft | 704/270 |
| 6,539,078 B1 * | 3/2003 | Hunt et al. | 379/88.04 |
| 6,594,347 B1 * | 7/2003 | Calder et al. | 379/88.01 |
| 6,601,031 B1 * | 7/2003 | O'Brien | 704/270.1 |
| 6,731,724 B2 | 5/2004 | Wesemann et al. | |
| 7,120,234 B1 | 10/2006 | Quinn et al. | |
| 2001/0012350 A1 | 8/2001 | Ehlinger | |
| 2002/0057783 A1 * | 5/2002 | Kredo et al. | 379/218.01 |

* cited by examiner

VOICE-OPERATED INTERFACE FOR DTMF-CONTROLLED SYSTEMS

PRIORITY INFORMATION

The present application is a continuation of U.S. patent application Ser. No. 14/021,452, filed Sep. 9, 2013, which is a continuation of U.S. patent application Ser. No. 11/051,523, filed Feb. 4, 2005, now U.S. Pat. No. 8,532,267, issued Sep. 10, 2013, which is a continuation of U.S. patent application Ser. No. 09/757,454, filed Jan. 10, 2001, now U.S. Pat. No. 6,868,142, issued Mar. 15, 2005, the contents of which are incorporated herein by reference in their entirety.

TECHNICAL FIELD

The present invention relates to an arrangement for accessing dual-tone multifrequency (DTMF)-controlled systems such as voice messaging systems and, more particularly to a voice-operated (i.e., "hands-free") arrangement for accessing such DTMF-controlled systems.

BACKGROUND OF THE INVENTION

Most conventional voice mail systems utilize a DTMF-controlled telephony application to access the system and retrieve stored messages. In particular, a voice mail subscriber needs to enter his account number (and perhaps a password) to gain access to the system (where the subscriber's telephone number may be used as the account number). Various DTMF tones are then used to progress through the voice mail menu (e.g., using a "#" sign to retrieve new messages, a "1" to delete messages, a "2" to skip to the next message, etc.), where different systems may use different DTMF tones to control the message retrieval process. In general, there exist a variety of DTMF-controlled systems, such as interactive banking systems, hotel reservation systems, etc., where one maneuvers through different levels of menus by entering DTMF tones on a telephone keypad.

Many individuals now use relatively small cell phones that include the DTMF keypad on the same structure as the transmitter (microphone) and receiver (speaker). When using such a cell phone to access a DTMF-controlled system, the phone must constantly be moved between an individual's line-of-sight (to enter the proper DTMF tones) and his ear (to listen to messages or commands from the voice mail system). In another common scenario, many individuals now retrieve voice mail messages while traveling in their cars. While many car phones today have a "hands-free" option for dialing outbound calls (see, for example, U.S. Pat. No. 5,805,672), once the call has been established, the person traveling in the car still needs to use the keypad on the car phone to further access different telecommunications-based services and systems.

Thus, a need remains in the art for an arrangement capable of providing "hands-free" access to and progress through any DTMF-controlled telecommunications system, particularly when accessing such a system with a device such as a cell phone.

SUMMARY OF THE INVENTION

The need remaining in the prior art is addressed by the present invention, which relates to an arrangement for accessing a DTMF-controlled system (such as, for example, a voice messaging system) and, more particularly to a voice-operated (i.e., "hands-free") arrangement for accessing such a system.

In accordance with the present invention, a speech-to-DTMF tone application is provided for and accessed by a user wishing to interact with a DTMF-controlled system in a "hands-free" manner. The speech-to-DTMF tone application is responsive to a user's initial voice prompt (via a speech recognition unit) to allow access to the application and locate the proper user's record in the application database. The speech-to-DTMF tone application looks up the user's access number, dials out to the associated system and then connects the user to the proper DTMF-controlled system. The application stays on the line and "listens" for predetermined voice commands from the user (i.e., "next", "delete", "repeat", etc.). When such a voice command occurs, the application performs a translation from the command to the DTMF tones used by that system, and forwards the proper tones to the system.

While "listening" for one of the predetermined voice commands, the speech-to-DTMF application allows all of the audio signals to also pass through from the user to the DTMF-controlled system. The passage of the audio signals allows the user to speak to the system (such as when recording a message), as well as to directly use the system with the DTMF commands. Thus, the user may mix voice commands and DTMF commands without constraint.

In a preferred embodiment of the present invention when a user has more than one DTMF-controlled system (such as in the case of multiple voice message accounts), the speech-to-DTMF tone application is capable of processing through each system and transmitting the individual tones recognized by each system.

The speech-to-DTMF tone application of the present invention may be formed as either a network-based application or, alternatively, may be embedded within an individual's cell phone.

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
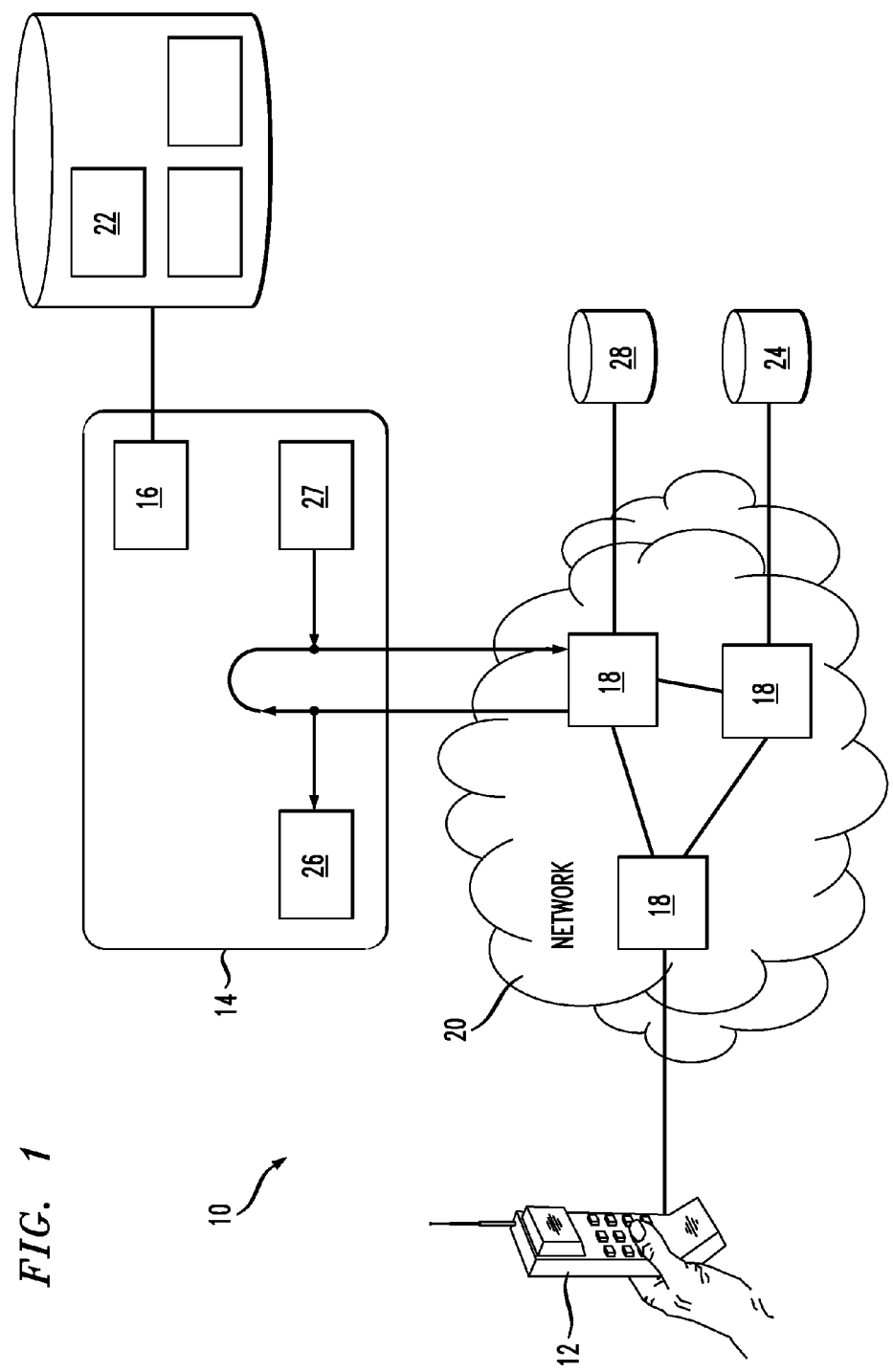
FIG. 1 illustrates an exemplary network arrangement for deploying the voice-activated DTMF-controlled system of the present invention.

A simplified network architecture 10 capable of supporting the voice-operated interface of the present invention is illustrated in FIG. 1. For the sake of simplicity, a single user 12 is shown, although any communication is known to support thousands of such users. In accordance with the present invention, user 12 may be defined as an individual utilizing a cell phone, a car phone, or any other communication device that may include the keypad on the same unit as the transmitter (microphone) and receiver. However, the speech-to-DTMF tone application may also be used with any type of telephone device and, as such, may be useful to those with limited abilities to use a keypad for a variety of reasons (eyesight problems, hand control problems, etc.). It is to be understood that as an alternative to the network-based arrangement of FIG. 1, the speech-to-DTMF tone application of the present invention may be implemented as a stand-alone application within the user's telecommunication device (e.g., cell phone).

Referring back to FIG. 1, user 12 employs the speech-to-DTMF tone application of the present invention by first dialing a predefined telephone number to access a speech server 14 supporting a speech-to-DTMF tone application 16. This communication is generally established, in the architecture as shown in FIG. 1, through a set of communication switches 18 forming a communication network 20 (in one example, network 20 may comprise the public switched telephone network, commonly referred to as the PSTN). Once communication is established with speech server 14, user 12 will be prompted to enter voice commands to identify himself (and, perhaps, further password information) and allow speech-to-DTMF tone application 16 to locate the proper user record 22, where an exemplary user record 22 will be described in detail below in association with the discussion of FIG. 2. Upon locating the proper user record 22, application 16 will launch a telephone call to the associated DTMF-controlled system 24, then bridge together the incoming call from user 12 with this call to DTMF-controlled system 24. One example of such a DTMF-controlled system is a voice messaging system (which uses various DTMF tones—or combination of tones—to control message playback and responses, such as "forward", "next", "skip", etc.). Various other DTMF-controlled systems include bank access systems, reservation systems, etc. In general, the speech-to-DTMF application of the present invention is equally applicable to all such systems. Throughout this discussion, the operation of the present invention will often be discussed in terms of a "voice mail messaging system". It is to be presumed, however, that the inventive technique is equally applicable to all such systems.

Application 16 will stay on the call, listening for predetermined voice prompts from user 12 as the call progresses through the DTMF-controlled system, such as a message retrieval process. For example, the voice prompts may include commands such as "next", "skip", "back", "first", "delete", etc. Indeed, virtually each command used by a DTMF-controlled system may be implemented as a voice prompt from user 12. Application 16 is then used to translate the recognized prompts into the proper DTMF tone (or tones) utilized by the system 24 currently being accessed. These tones are then played out to the voice messaging system by the speech server's player 27. Speech player 27 may also play verification prompts back to user 12. For example, when application 16 determines that the user spoke the word "delete", application 16 can direct player 27 to prompt user 12 back with a confirmation response of "deleted".

User 12 may interact directly with the DTMF-controlled system at any time during the interaction through speech-to-DTMF tone application 16. Referring to FIG. 1, if user 12 presses a key on his/her phone to send a DTMF tone (or tones) to the system, that tone(s) will be carrier through the network to speech server 14, then carried through the call bridge in server 14 back to the network, and finally to DTMF-controlled system 24. In this way, the user can move arbitrarily back and forth between the DTMF tone controls that he/she normally uses and the voice commands that application 16 makes available. Similarly, user 12 is not prevented from speaking to the DTMF-controlled system. For example, if the user needs to record a message, or place a call using a "return call" option on an exemplary DTMF-controlled messaging system, he can speak and his voice will be carried through the bridge on server 14 to the DTMF-controlled messaging system.

As will be discussed in detail below, an aspect of the present invention in the capability of application 16 to access more than one DTMF-controlled system associated with a single user 12. For example, a second messaging system 28 is illustrated in FIG. 1 and may be accessed by spoken command, e.g., "get my messages from work", where it is to be noted that user 12 has previously designated a particular mailbox as "work", such as system 28.

Figure 2:
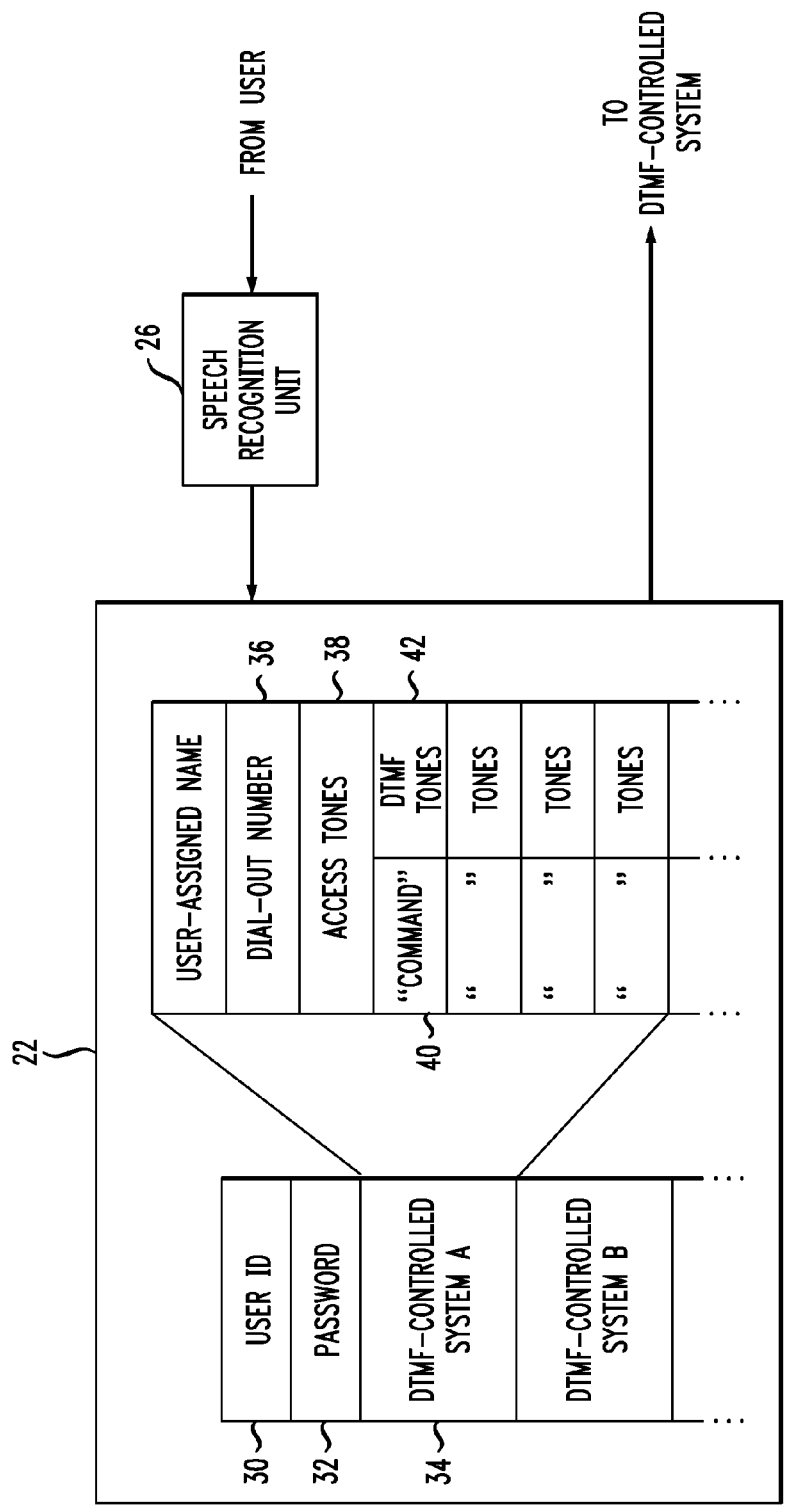
FIG. 2 is a simplified diagram illustrating portions of the speech-to-DTMF tone application of the present invention.

FIG. 2 illustrates in more detail some of the components utilized within speech server 16 to provide the speech-to-DTMF tone application 16 of the present invention. In this case, a single user record 22 is illustrated, as is its interconnection to speech recognition unit 26. As mentioned above, all incoming voice signals from user 12 pass through speech recognition unit 26, which uses well-known techniques to translate the received voice signals into digital signal messages that are then used by the rest of the application to perform the desired functions. In this case, user 12 first provides an "identification" message prompt which passes through recognition unit 26 and is used to locate the proper user record 22 in application 16. Additional password information may be required, for security reasons, but is not necessary to implement the system of the present invention. A "user ID" field 30 and password field 32 are both shown in the exemplary record 22 of FIG. 2. Record 22 includes, for each DTMF-controlled system associated with user 12, various fields of information required to access the particular system and provide the desired DTMF tones. An exploded view of one such set of fields is illustrated in FIG. 2, in this case associated with voice messaging system "A" of user 12 (which may be, for example, message system 24 as shown in FIG. 1).

In accordance with the present invention, application 16 retrieves the dial-out telephone number associated with messaging system "A", as stored in field 36 of record 22, and initiates a telephone call to that messaging system. If further tones are required to access user 12's account in system "A", those tones may be stored in field 38 of record 22 and used by application 16 to access the proper voice mail account of user 12. Once a call to messaging system "A" has been established, application 16 will bridge the incoming call from user 12 with this call so that user 12 can begin to retrieve the stored messages. Application 16, in accordance with the present invention, will "stay on the line" during the message retrieval process, "listening" for predetermined voice prompts from user 12 and then translating these commands into DTMF tones that are then sent to the messaging system to control certain actions within the system. In particular, speech recognition unit 26 is configured to recognize those commands that are listed for the specific DTMF-controlled system that is being called, in the record of the current user. In FIG. 2, field 40 is an example of such a command in the list. Field 40 might contain the word "delete", the next field might have "play", the next "reply", etc. These words would form the "vocabulary" of the speech recognition unit for the duration of the call from the specific user to the specific DTMF-controlled system. If the user selected a different system, or if a new user calls in, then the vocabulary for the speech recognition would be re-loaded, based on the command list contained in the record.

The DTMF tones to be transmitted with each command are also listed for each DTMF-controlled system in each user's record. For example, if speech recognition unit 26 receives the prompt "delete" from user 12, unit 26 will recognize the spoken word "delete" and forward it to application 16. Application 16 will perform a look-up in record 22, locating "deleted" in field 40 (in this particular example) and retrieve the DTMF tones from field 42 (e.g., "*1") that are associated with deleting a message. In accordance with the present invention, application 16 will then transmit these tones to messaging system "A", and the identified message will be deleted. Various other prompts (i.e., "skip", "next", "first", "end", etc.) may all be stored as separate fields in record 22 and will be translated in a similar fashion as discussed above. As will be discussed below, user 12 can at any time decide to retrieve messages from other messaging systems (such as messaging system "B" identified in FIG. 2).

Figure 3:
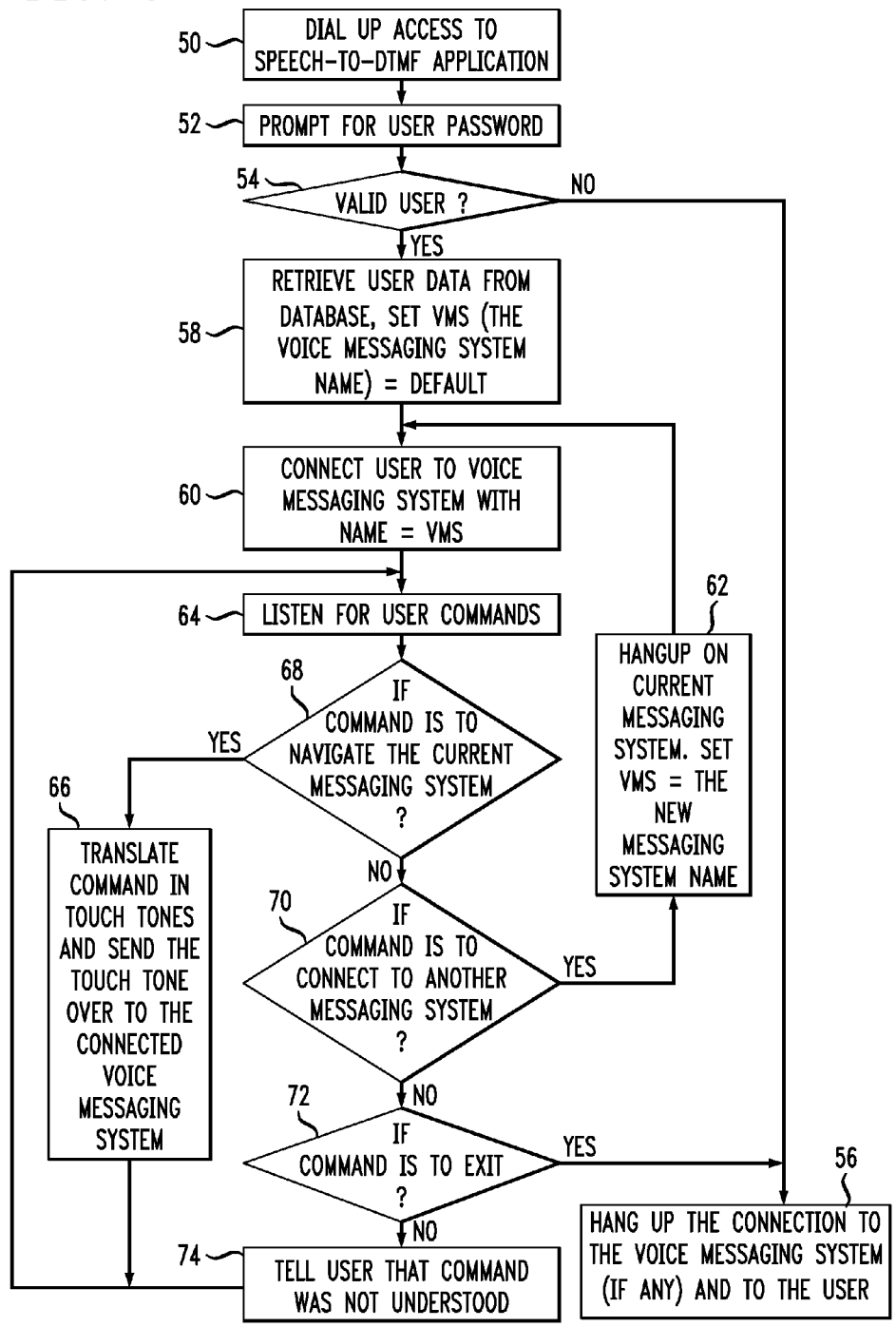
FIG. 3 contains a flowchart of an exemplary process for a user to interact with one or more voice mail accounts through the speech-to-DTMF tone application of the present invention.

FIG. 3 contains a flowchart illustrating an exemplary process that may be employed in implementing the speech-to-DTMF tones application of the present invention in the voice messaging environment. As shown, the process begins (block 50) with a user dialing into the speech-to-DTMF tone application, where the dial-in number may be provided to a user who has subscribed to such "special services" in association with his telecommunication services. Once the application has been accessed, it will send back a prompt to the user (block 52) requesting identification information, such as in the form of a "user ID" and password. The response information from the user is then checked to determine if the individual is indeed an "authorized" user who has subscribed to this particular service (block 54). If no such user is found, the program will exit (block 56). Otherwise, the application will use the user-supplied information to retrieve the proper user record from the database (block 58), where as discussed above, the user record contains all of the information required for the speech-to-DTMF tone application to interact with the user's voice messaging systems, including a designation of a "default" messaging system to retrieve messages from if a particular messaging system is not designated.

As shown in FIG. 3, the application will dial out to the user's selected voice messaging system (block 60), using the dial-out number stored in the user's record and will bridge together the incoming call from the user with that call. Instead of hanging up, however, the application will "listen" to the user's speech commands (differentiating the user's speech from the voices played back in the received messages) (block 64). If the command is to navigate within the messaging system (i.e., "next", "delete", "previous", etc.), the speech recognition unit in the application will then translate the received command into associated DTMF tones (block 66) and the application will forward these tones to the messaging system. As discussed above, the various voice prompts that the application is listening for include all of the conventional commands associated with a voice mail system (such as, "next", "delete", "skip", etc.), as the user desires to connect to another messaging system or hang up. If the user's command is to connect to another DTMF-controlled system (block 70), then the connection to the current system is broken and a call to the new DTMF-controlled system is made and bridged with the user's incoming call (blocks 62, 60). If the command is to exit from the system (block 72), the calls are simply hung up (block 56). If the command is not understood by the system, the application will return an error message to the user (block 74).

Alternatively, the application may be configured to "ignore" any input that is not understood. This allows the user to speak to the messaging system without interference from the application. For example, the user may want to forward a message with a comment. The DTMF-controlled messaging system would then need to record the message from the user. The user could leave a message, and as long as the message did not include an isolated utterance of a command that the application is listening for at that time, it would not interfere with the message recording.

In an alternative embodiment of the present invention, a "local" speech-to-DTMF tone application may be included in the user's cell phone, instead of utilizing the network-based arrangement shown in FIG. 1. In such a case, the user ID and password information would not be necessary. However, such an embodiment would entail the inclusion of a speech recognition unit and memory unit storing the various information described above. In either case, the system is capable of providing "hands-free" access to DTMF-controlled systems and, in general, the subject matter of the present invention is intended to be limited in spirit only by the scope of the claims appended hereto.

What is claimed is:

1. A method comprising:
receiving a voice command;
when the voice command corresponds to a user customized dual-tone multifrequency tone command in a user record, translating the voice command into a dual-tone multifrequency tone based on the user record, to yield the user customized dual-tone multifrequency tone command;
interacting with a remote dual-tone multifrequency-controlled system via the user customized dual-tone multifrequency tone command; and
when the voice command does not correspond to the user customized dual-tone multifrequency command in the user record, performing an action associated with the voice command.

2. The method of claim 1, further comprising:
bridging together a first call between a user and a speech-to-dual-tone multifrequency tone application and a second call between the speech-to-dual-tone multifrequency tone application and the remote dual-tone multifrequency-controlled system.

3. The method of claim 2, further comprising:
transmitting the dual-tone multifrequency tone from the speech-to-dual-tone multifrequency tone application to the remote dual-tone multifrequency-controlled system.

4. The method of claim 1, further comprising:
requesting a user to input spoken user identifying information;
receiving the spoken user identifying information from the user;
validating the spoken user identifying information; and
permitting the user to access the remote dual-tone multifrequency-controlled system after successfully validating the spoken user identifying information.

5. The method of claim 1, wherein the dual-tone multifrequency tone corresponds to commands for a plurality of remote dual-tone multifrequency-controlled systems.

6. The method of claim 5, further comprising translating, using the user record, a plurality of user voice commands into corresponding dual-tone multifrequency commands for interacting with two remote dual-tone multifrequency-controlled systems.

7. The method of claim 1, wherein the user record further comprises dial-out information associated with the remote dual-tone multifrequency-controlled system.

8. A system comprising:
a processor; and
a computer-readable storage medium having instructions stored which, when executed by the processor, cause the processor to perform operations comprising:
receiving a voice command;

when the voice command corresponds to a user customized dual-tone multifrequency tone command in a user record, translating the voice command into a dual-tone multifrequency tone based on the user record, to yield the user customized dual-tone multifrequency tone command;

interacting with a remote dual-tone multifrequency-controlled system via the user customized dual-tone multifrequency tone command; and when the voice command does not correspond to the user customized dual-tone multifrequency command in the user record, performing an action associated with the voice command.

9. The system of claim 8, the computer-readable storage medium having additional instructions stored which, when executed by the processor, result in operations comprising:

bridging together a first call between a user and a speech-to-dual-tone multifrequency tone application and a second call between the speech-to-dual-tone multifrequency tone application and the remote dual-tone multifrequency-controlled system.

10. The system of claim 9, the computer-readable storage medium having additional instructions stored which, when executed by the processor, result in operations comprising:

transmitting the dual-tone multifrequency tone from the speech-to-dual-tone multifrequency tone application to the remote dual-tone multifrequency-controlled system.

11. The system of claim 8, the computer-readable storage medium having additional instructions stored which, when executed by the processor, result in operations comprising:

requesting a user to input spoken user identifying information;

receiving the spoken user identifying information from the user;

validating the spoken user identifying information; and permitting the user to access the remote dual-tone multifrequency-controlled system after successfully validating the spoken user identifying information.

12. The system of claim 8, wherein the dual-tone multifrequency tone in the user record corresponds to commands for a plurality of remote dual-tone multifrequency-controlled systems.

13. The system of claim 12, the computer-readable storage medium having additional instructions stored which, when executed by the processor, result in operations comprising translating, using the user record, a plurality of user voice commands into corresponding dual-tone multifrequency commands for interacting with two remote dual-tone multifrequency-controlled systems.

14. The system of claim 8, wherein the user record further comprises dial-out information associated with the remote dual-tone multifrequency-controlled system.

15. A computer-readable storage device having instructions stored which, when executed by a computing device, cause the computing device to perform operations comprising:

receiving a voice command;

when the voice command corresponds to a user customized dual-tone multifrequency tone command in a user record, translating the voice command into a dual-tone multifrequency tone based on the user record, to yield the user customized dual-tone multifrequency tone command;

interacting with a remote dual-tone multifrequency-controlled system via the user customized dual-tone multifrequency tone command; and when the voice command does not correspond to the user customized dual-tone multifrequency command in the user record, performing an action associated with the voice command.

16. The computer-readable storage device of claim 15, having additional instructions stored which, when executed by the computing device, result in operations comprising:

bridging together a first call between a user and a speech-to-dual-tone multifrequency tone application and a second call between the speech-to-dual-tone multifrequency tone application and the remote dual-tone multifrequency-controlled system.

17. The computer-readable storage device of claim 14, having additional instructions stored which, when executed by the computing device, result in operations comprising:

transmitting the dual-tone multifrequency tone from the speech-to-dual-tone multifrequency tone application to the remote dual-tone multifrequency-controlled system.

18. The computer-readable storage device of claim 15, having additional instructions stored which, when executed by the computing device, result in operations comprising:

requesting a user to input spoken user identifying information;

receiving the spoken user identifying information from the user;

validating the spoken user identifying information; and permitting the user to access the remote dual-tone multifrequency-controlled system after successfully validating the spoken user identifying information.

19. The computer-readable storage device of claim 15, wherein the dual-tone multifrequency tone in the user record corresponds to commands for a plurality of remote dual-tone multifrequency-controlled systems.

20. The computer-readable storage device of claim 19, having additional instructions stored which, when executed by the computing device, result in operations comprising translating, using the user record, a plurality of user voice commands into corresponding dual-tone multifrequency commands for interacting with two remote dual-tone multifrequency-controlled systems.

* * * * *